(12) United States Patent
Severns

(10) Patent No.: US 6,522,414 B1
(45) Date of Patent: Feb. 18, 2003

(54) METHOD AND APPARATUS FOR CHARACTERIZATION OF LIGHT BEAM DEFLECTION IN A MULTI-HEAD OPTICAL STORAGE SYSTEM

(75) Inventor: Dean Walter Severns, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/346,834

(22) Filed: Jul. 2, 1999

Related U.S. Application Data

(60) Provisional application No. 60/103,691, filed on Oct. 10, 1998.

(51) Int. Cl.$^7$ .............................................. G01B 11/00
(52) U.S. Cl. .................................. 356/614; 360/114.01
(58) Field of Search .............................. 360/114, 114.01, 360/114.02; 356/614; 369/112.21

(56) References Cited

U.S. PATENT DOCUMENTS 5,513,166 A * 4/1996 Tokumitsu et al. .......... 369/116
6,108,088 A * 8/2000 Drake et al. ................ 356/614

* cited by examiner

Primary Examiner—Richard A. Rosenberger
(74) Attorney, Agent, or Firm—Kirk A. Cesari; Derek J. Berger

(57) ABSTRACT

A system for evaluating a head stack assembly used in an optical or optically assisted hard drive is provided. The system utilizes a reflective surface that is provided in a forward and return optical path that includes an optical head and associated optical components.

14 Claims, 9 Drawing Sheets

SUPPORT ASSEMBLY

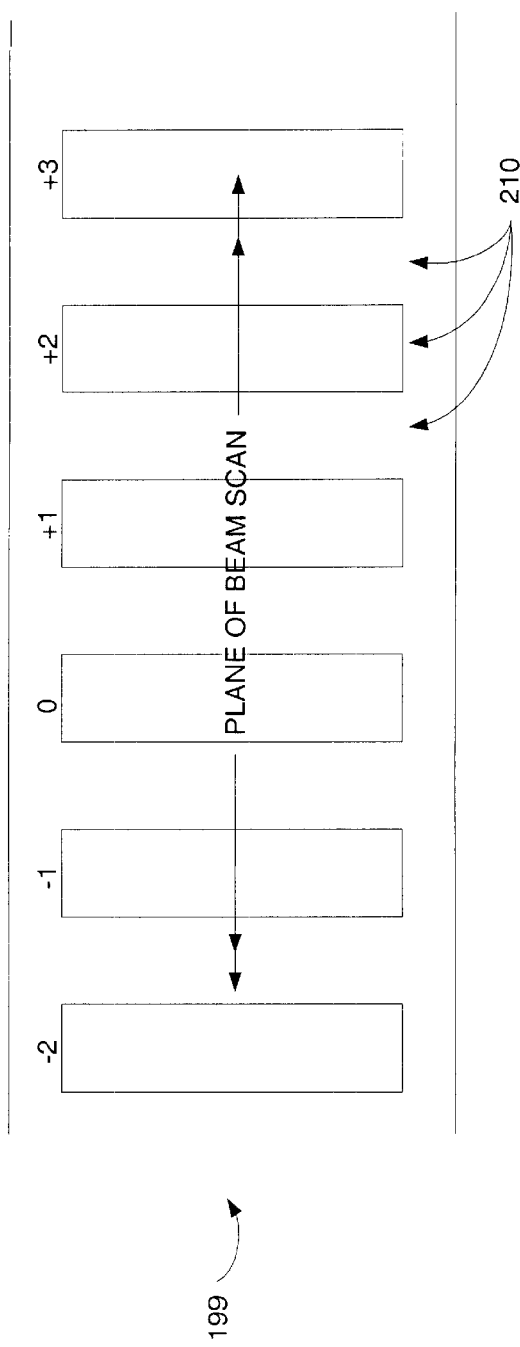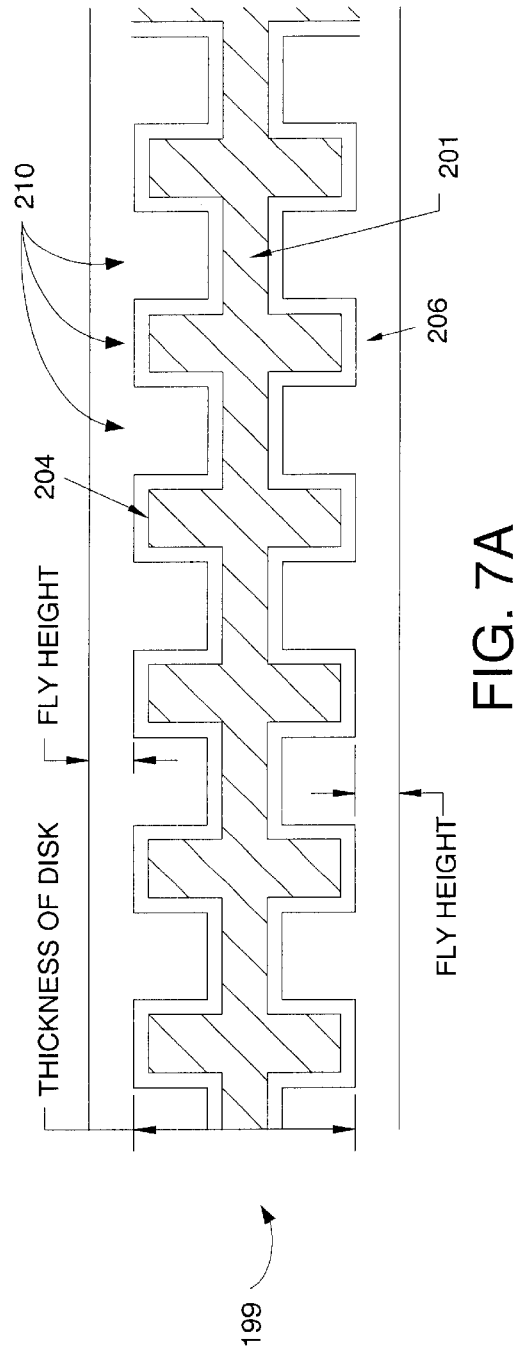
FIG. 7B
FIG. 7A

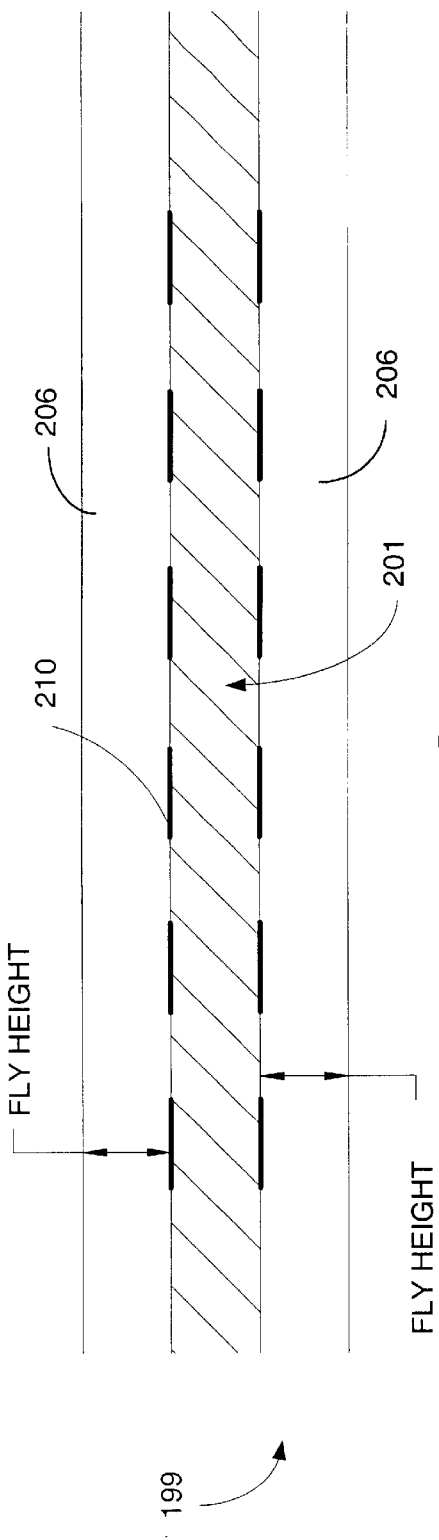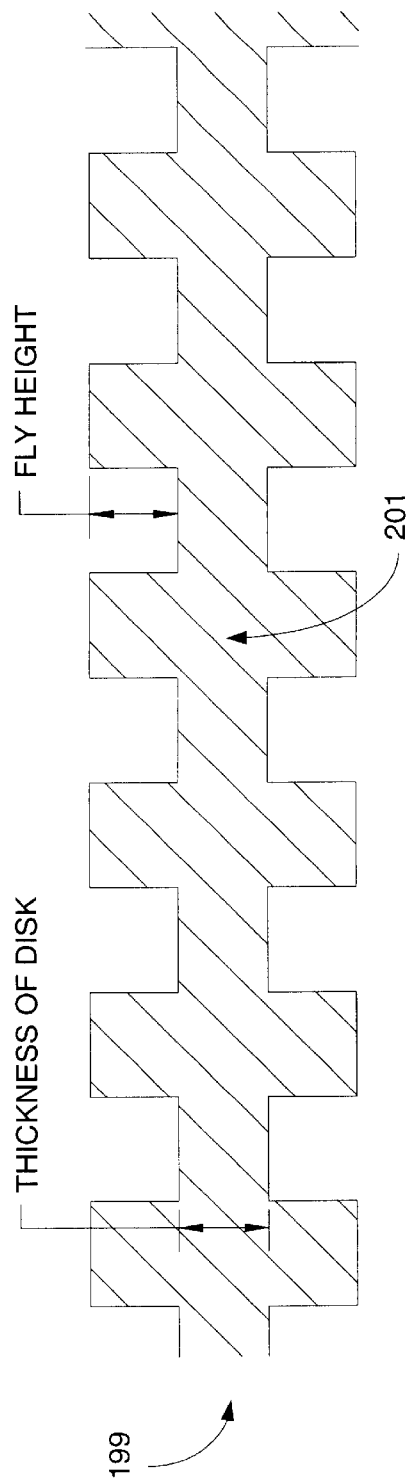

METHOD AND APPARATUS FOR CHARACTERIZATION OF LIGHT BEAM DEFLECTION IN A MULTI-HEAD OPTICAL STORAGE SYSTEM

RELATED APPLICATIONS

The present application is related to and claims priority from U.S. Provisional Application Ser. No. 60/103,691 filed Oct. 10, 1998.

BACKGROUND OF THE INVENTION

1. Field of the Invention

The present invention relates generally to the evaluation of light through an optical head, and more particularly to the evaluation of light in sub assembly testing of a multi-head optical storage system.

2. Background

Read-write optical heads that include active optics may be characterized by verification testing of an optical path of light that is altered by the optics. This testing may include a determination of the magnitude of a vector angle or a frequency response obtained based on the characterization of the optics.

Problems may result when evaluating the light during sub-assembly testing of read-write optical heads in a multi-head disk storage system, for example, when placing a light sensitive detector for monitoring the light between each of a plurality of flying heads comprising the subassembly. In this type of system, only one detector typically fits between the heads, requiring one fixture for up facing heads and a separate fixture for down facing heads. This approach also requires external circuitry to acquire a signal from separate detectors, preventing the use of a standard drive controller board to perform the test process. These detectors and fixturing add additional process steps to the assembly of the storage system, resulting in increased cost and handling of parts as well as potential damage to components. In this approach, there also does not exist any provision for measuring light in the return leg of the light and, thus, the complete optical path cannot be evaluated.

What is needed, therefore, is an improved method and apparatus for evaluating optical components in sub-assembly testing of multiple heads of a multi-disk optical system.

SUMMARY OF THE INVENTION

The present invention includes an apparatus for testing a head stack assembly, comprising: a substrate, wherein the substrate receives a light from the head stack assembly and directs a reflection of the light back to the head stack assembly, and wherein the head stack assembly is characterized based on the reflection of the light. The substrate may comprise a first surface, wherein first surface comprises a plurality of features for disrupting the reflection of the light. The substrate may further comprise a second surface disposed in generally parallel opposition to the first surface, wherein second surface comprises a plurality of features for disrupting the reflection of the light. The head stack assembly may comprise at least two optical heads, wherein the substrate comprises a surface, wherein the surface is disposed between the at least two optical heads, wherein the light from the head stack assembly received by the surface is delivered from a one of the at least two optical heads, and wherein the one of the at least two optical heads is characterized based on the reflection of the light from the surface.

The light from the head stack assembly may be directed to the surface by a moveable part disposed on the optical head, wherein the moveable part acts to direct the light across the plurality of features. The present invention may further comprise and analyzer for analyzing the reflection of the light. The moveable part may comprise a steerable mirror, wherein the characterization comprises measurement of a voltage applied to the steerable mirror to deflect the steerable mirror. The head stack may comprise a plurality of optical fibers, wherein the characterization may be based on measurement of the reflection of the light from a particular one of the plurality of optical fibers. The characterization may also comprise an identification of a particular one of the plurality of optical fibers.

The present invention may also comprise a substrate, wherein the substrate receives light from the moveable optics; reflection means for providing a reflection of the light; and analyzing means for characterizing the moveable optics based on the reflection of the light. The reflection means may comprise disruption means for disrupting the light from the moveable optics. The moveable optics may comprise a steerable mirror.

The present invention may also comprise a method of testing a head stack assembly comprising the steps of: directing a light with optics of the head stack assembly toward a substrate, receiving a reflection of the light form the substrate, and characterizing the head stack assembly based on the reflection of the light. The present invention may further comprise a step of disrupting the light with substrate features. The present invention may further comprise a step of wherein the step of directing the light with the optics toward the substrate comprises directing the light with dynamic optics. The dynamic optics may comprise steerable optics. The present invention may further comprise a step of wherein the step of directing the light and receiving the reflection of the light comprises directing the light and receiving the reflection of the light with optics comprising an optical fiber. The present invention may further comprise a step of wherein the characterization includes detection of the reflected light from the optical fiber. The present invention may further comprise a step of wherein the characterization includes evaluating a functionality of the steerable optics. The present invention may further comprise a step of wherein the characterization includes evaluating a frequency response of the steerable optics.

Accordingly, several objects and advantages of the present invention are:

(a) to provide for the use of a computer to take, transfer, and store test results for head stack assemblies for later retrieval and analysis;

(b) to provide a means of testing a complete light path of an optical head-stack subassembly;

(c) to provide a means of testing micro-machined components;

(d) to provide a means of testing rotatable micro-machined mirrors for proper movement when a voltage is applied;

(e) to provide a measurement of the natural frequency of a micro-machined mirror;

(f) to provide a means of determining which optical fiber in a fiber bundle is attached to which flying optical head;

(g) to provide a means of determining which optical fiber attached to an optical head is located in an optical switch; and (h) to accomplish the aforementioned testing using a single fixture and single installation of an optical head-stack sub-assembly.

The present invention may also comprise a data storage and retrieval system including a set of flying optical heads that are adapted for use with a set of spinning disks. The set of flying optical heads are coupled to a rotary actuator magnet and coil assembly by a respective suspension and actuator arm for positioning the set of heads over the surfaces of the set of spinning disks. In operation, lift forces are generated by aerodynamic interactions between the set of heads and the spinning disks. A flying height of a head (above the disk surface) is a balance of the lift force opposed by an equal and opposite spring force applied by each suspension. The optics of a given head are designed to be focused at a distance equal to said flying height.

In the present invention, a force measuring device known as a gram-load fixture may be modified to comprise an additional fixture providing a number of adapter plates preferably equaling one half the number of flying optical heads. These adapter plates are stacked such that they simulate disks of a drive assembly. A gram-load fixture is a device used to measure spring load force on each head of a head sub-assembly of a standard hard drive. As those skilled in the are aware, the gram-load measuring device individually determines the spring force acting on each head of the head sub-assembly. In this invention the adapter plates are included with the gram-load fixture to provide testing optics on the head.

The adapter plates provide a features from which a return beam of light is evaluated. The features can be made on any suitable substrate, the fixture design being such as to provide dimensions that approximate a typical flying head gap over a read-write surface while in operation. The evaluation may include determination of a vector angle and/or a mirror frequency response, provided the optics components on the head exhibit a dynamic component. In one embodiment of the invention, the dynamic component is provided by a moveable mirror, and features on the reflective surface contribute to evaluating head performance. Thus, in addition to measuring spring load force of the subassembly, optics components on the head can also be evaluated with one apparatus. In addition, bundled optical fibers coupled to the heads can be characterized by a determination as to which optical head is attached to which fiber.

BRIEF DESCRIPTION OF THE DRAWINGS

FIG. 7a is cross-sectional view of an adapter plate;

FIG. 7b is a top view of a adapter plate and features formed therein/thereon;

FIG. 7c is an alternative embodiment of the present invention;

FIG. 7d is another alternative embodiment of the present invention; and

DETAILED DESCRIPTION OF THE PREFERRED EMBODIMENT

Figure 1:
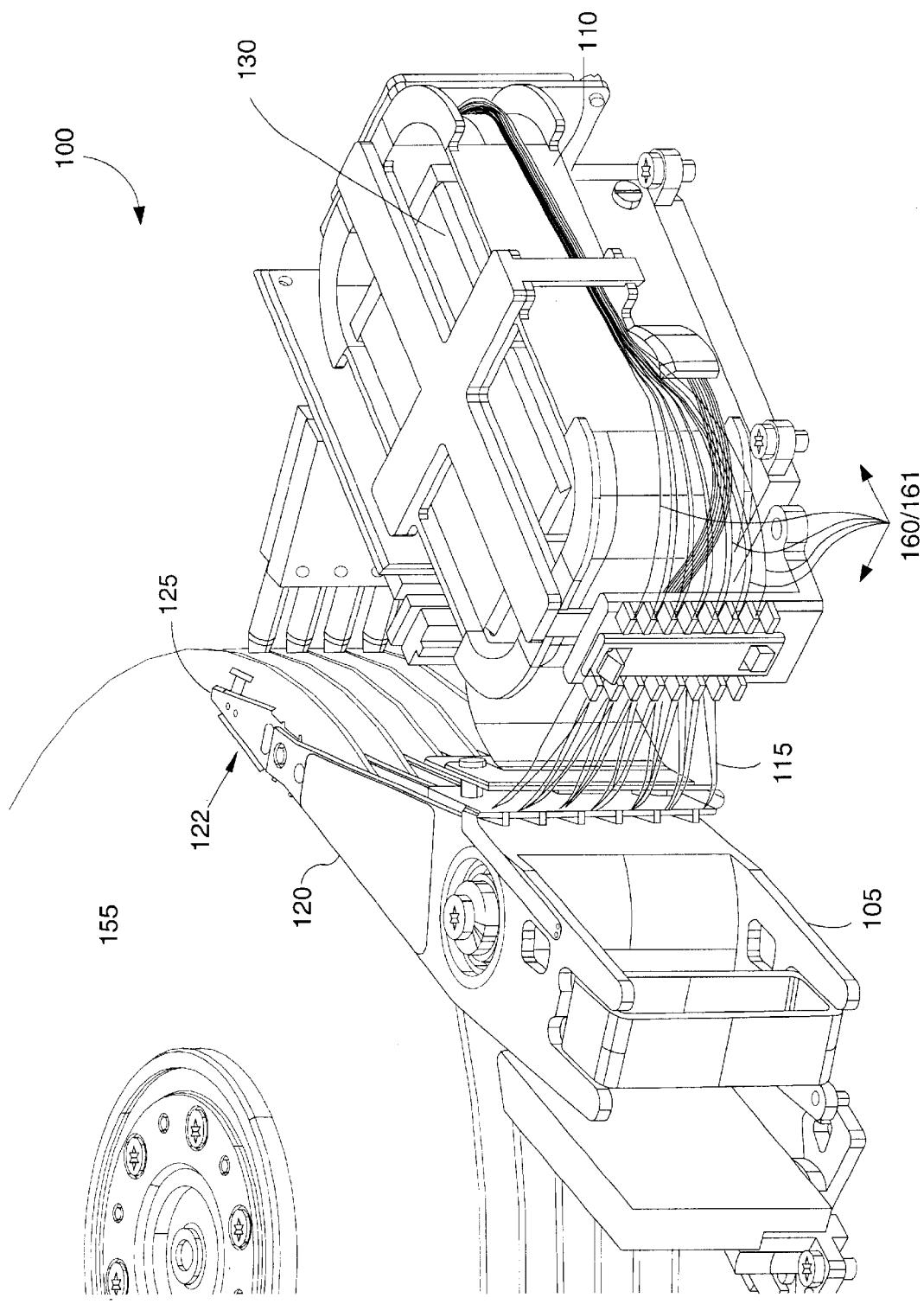
FIG. 1 is a perspective view of an optical hard drive.

Referring in detail to the drawings wherein similar parts are identified by like reference numbers, there is seen in FIG. 1 a perspective view of a multi-disk optical drive 100. In this view it is seen that a head stack assembly 105 may comprise individual optical heads 125, each of which is coupled to individual arms 120 through respective suspensions 122. In one embodiment, the optical heads 125 may comprise flying optical heads. Flying optical heads are understood to comprise air bearing surfaces that interact to aerodynamically maintain the optical heads 125 a distance above respective rotating disks 155. While the present invention is described with reference to flying optical heads, it is understood that other optical heads used in the disk drive industry are also with the scope of use with the present invention, for example, optical heads that do not utilize air bearing surfaces. It is understood that in other embodiments, the optical heads 125 may alternatively comprise magneto-optical heads. FIG. 1 further illustrates a group of individual optical fibers 115, which are all coupled to an optical switch 130 at one end and to individual ones of the optical heads 125 at an opposite end. The optical switch 130 selectively directs a light 160 from a source (not shown) to a particular one of the individual optical fiber 115. The optical fibers 115 function to route the light 160 between the optical switch 130 and a particular optical head 125.

Figure 2A:
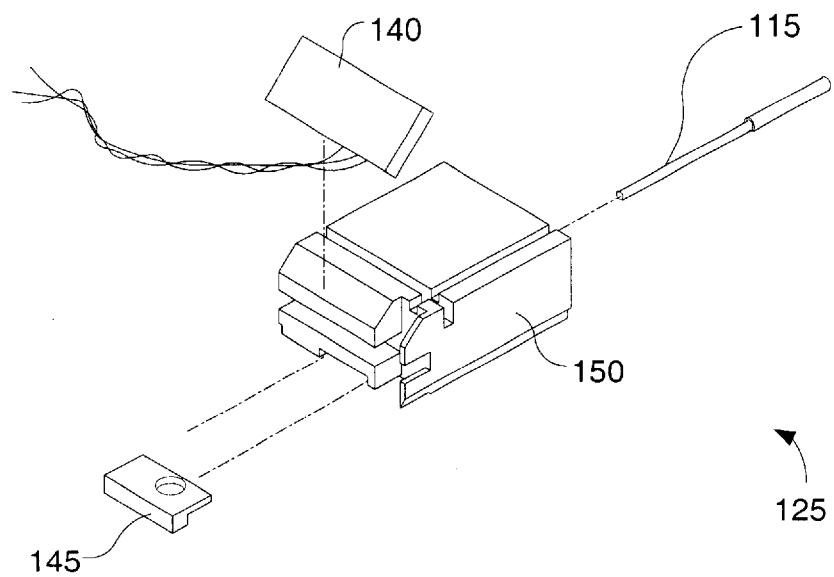
FIG. 2a is an exploded view of an optical head.
Figure 2B:
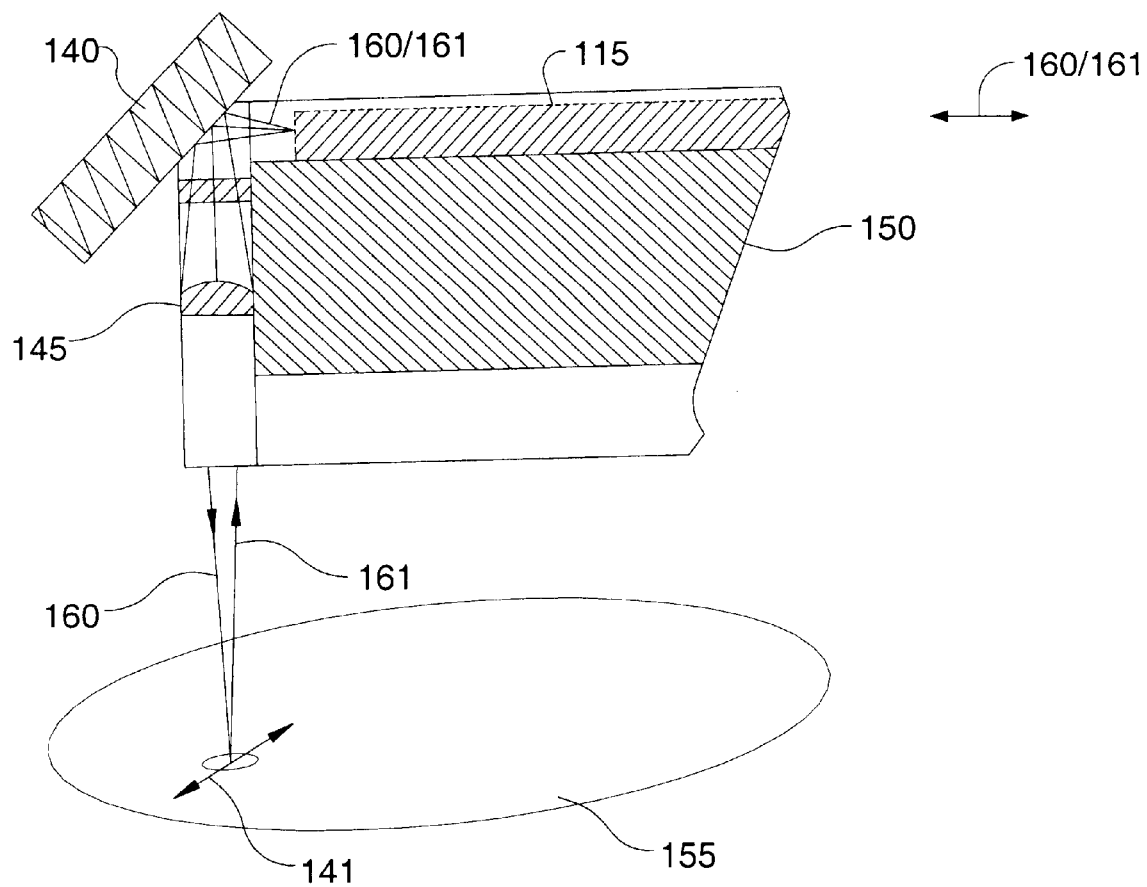
FIG. 2b is a side view of an optical head.

Referring now to FIGS. 2a and 2b, there is seen in FIG. 2a an exploded view of an optical head 125 in which is shown attached to a body 150, the optical fiber 115, a steerable micro-machined mirror 140, and a focusing lens 145. Illustrated in FIG. 2b is a cross-section of the optical head 125 and a path of the light as it travels along the optical fiber 115. The light 160 is vectored and reflected by the steerable micro-machined mirror 140 and focused by the lens 145. During normal drive operation, the light 160 is directed by the lens 145 onto a surface of a particular disk 155, and reflected light 161 is returned from the disk 155. The reflected light 161 is transmitted by the optical fiber 115 in an opposite direction to that of light 160 to the optical switch 130 and for processing by optics and electronics (not shown).

Figure 3:
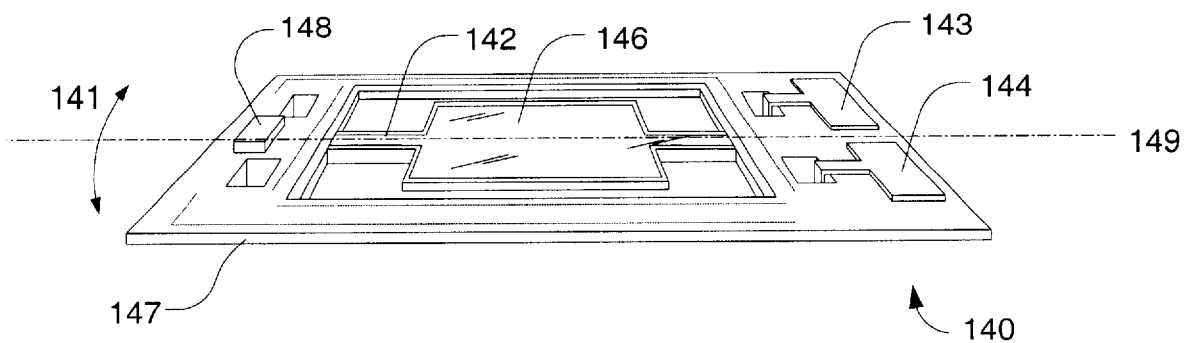
FIG. 3 is a perspective view of a steerable micro-machined mirror.

Referring now FIG. 3, the steerable micro-machined mirror 140 is seen to include a moveable portion 146 attached to a body 147 by beams 142. Bond pads 143 and 144 are connected electrically to drive electrodes (not shown) located underneath moveable portion 146 and separated from moveable portion 146 by an air gap. When a differential voltage is applied to pads 143/144 relative to a ground pad 148, a differential electrostatic force is applied to the moveable portion 146 to cause it to torsionally vector about the beams 142 by a desired angle 141 about axis 149. The mirror 140 is manufactured by utilizing micro-machining techniques and is described in commonly assigned and U.S. application Ser. No. 08/844,207, entitled "Data Storage System Having An Improved Surface Micro-Machined Mirror."

Figure 4B:
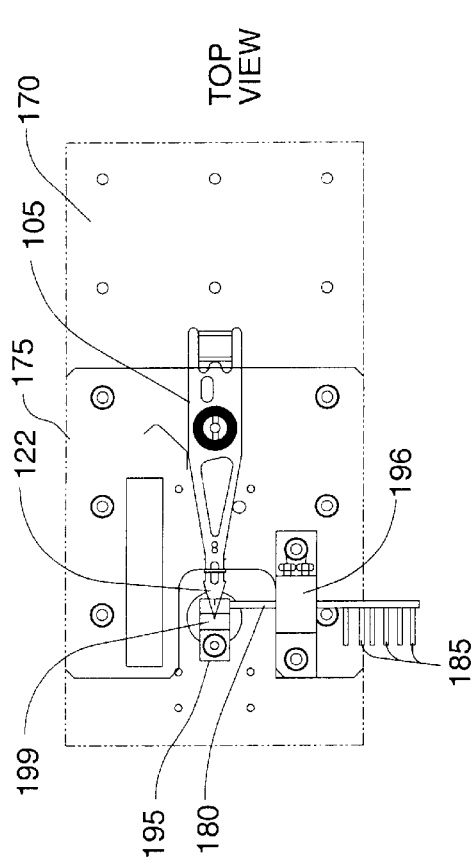
FIGS. 4a–c are views of an optical head stack-assembly installed onto a gram-load device that includes a support assembly of the present invention.
Figure 4A:
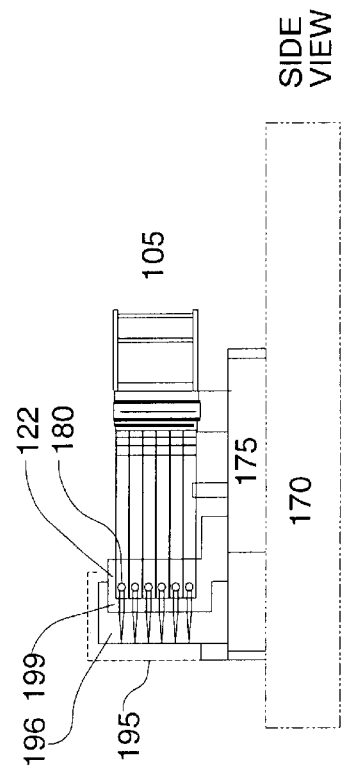

Referring now to FIGS. 4a and 4b, there is shown side and top views of an optical head-stack assembly 105 installed onto a force-measuring tool or gram-load device 177 that is modified to include a support assembly 195 of the present invention. The support assembly 195 comprises adapter plates 199, which are described in detail below. In use with the present invention, prior to assembly as part of drive 100, the head stack assembly 105, (including the optical heads 125, optical fibers 115, mirrors 140, and optical switch 130) is mounted onto the gram-load device 177.

Figure 4C:
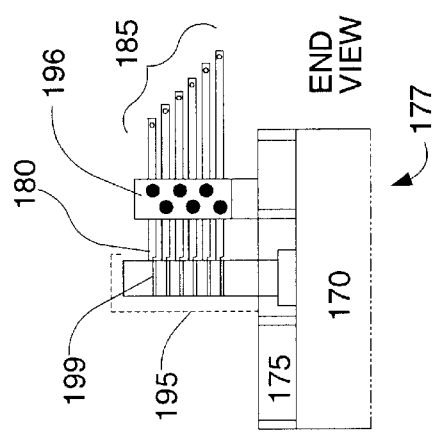

FIG. 4c is an end view showing the gram-load device 177 comprising a load fixture 196 and fixture plate 175. The load fixture 196 comprises load cams 180 of a generally semi-circle or half-circle shape in a cross-section, which when engaged between suspensions 122 and turned in a direction 185 rotate to allow a spring force from the suspensions 122 in the head stack assembly 105 to be applied to the load cams 180. The fixture plate 175 is bolted on top and electronically connected to the scale 170, which is capable of reading forces exerted by the suspensions 122 of the head stack assembly 105.

Figure 5:
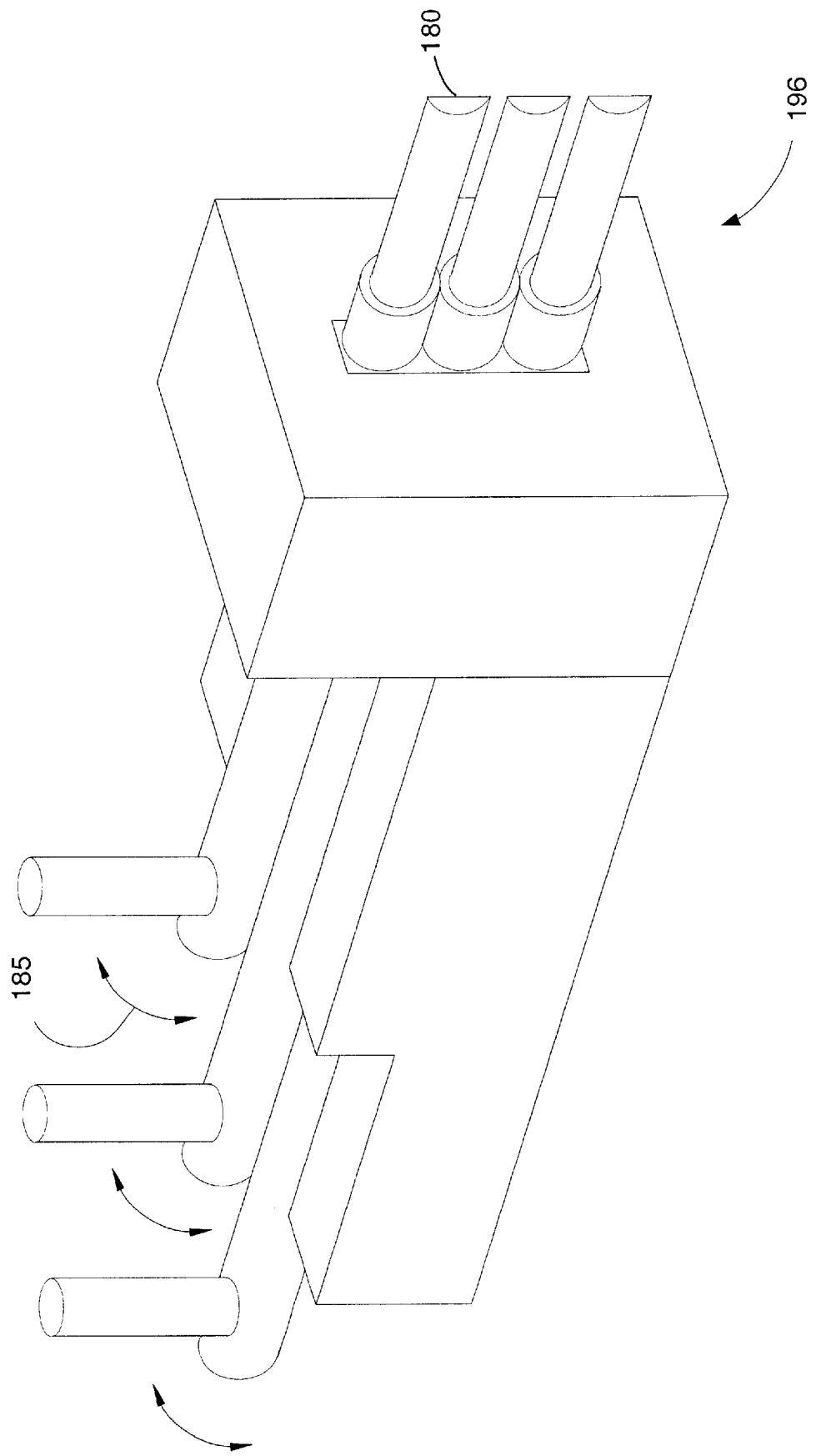
FIG. 5 is a perspective view of a load fixture comprising load cams.

Referring now to FIG. 5, there is shown a close up perspective view of a representative load fixture 196 comprising the load cams 180 wherein although a 3 cam embodiment is shown it is understood that other numbers of cams are within the scope of the present invention.

Figure 6:
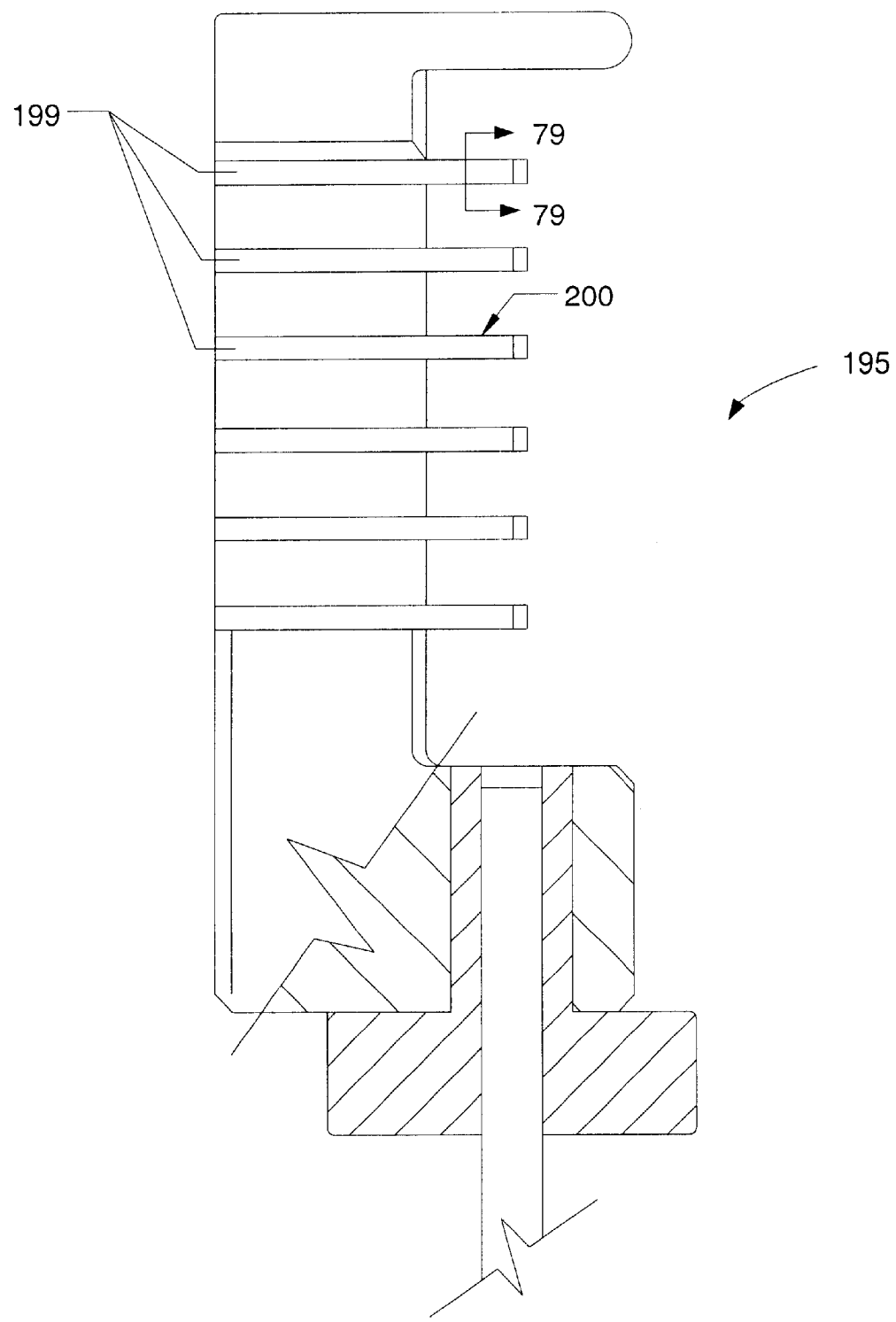
FIG. 6 shows a support assembly and adapter plates of the present invention.

Referring now to FIG. 6 there is seen a side view of the support assembly 195 of present invention. The support assembly 195 includes adapter plates 199. The adapter plates 199 each comprise an upper side and a lower side 200.

Referring now to FIG. 7a, there is shown a cross-section through a particular adapter plate 199. In the preferred embodiment, the adapter plate 199 may comprise pattern of features 210 that may include, for example, grooves or the like, which may be etched or formed into or onto a suitable substrate 201, such as glass, over which may be deposited a reflective layer 204, such as gold, to provide a reflective surface. A transparent protective coating 206, such as silicon dioxide, may be deposited over the reflective layer 204. It is understood that the reflective layer 204 may not be required if the substrate 201 itself is sufficiently reflective. FIG. 7b illustrates a top view of an adapter plate 199 and one particular pattern of the features 210 formed therein/thereon.

Figure 8:
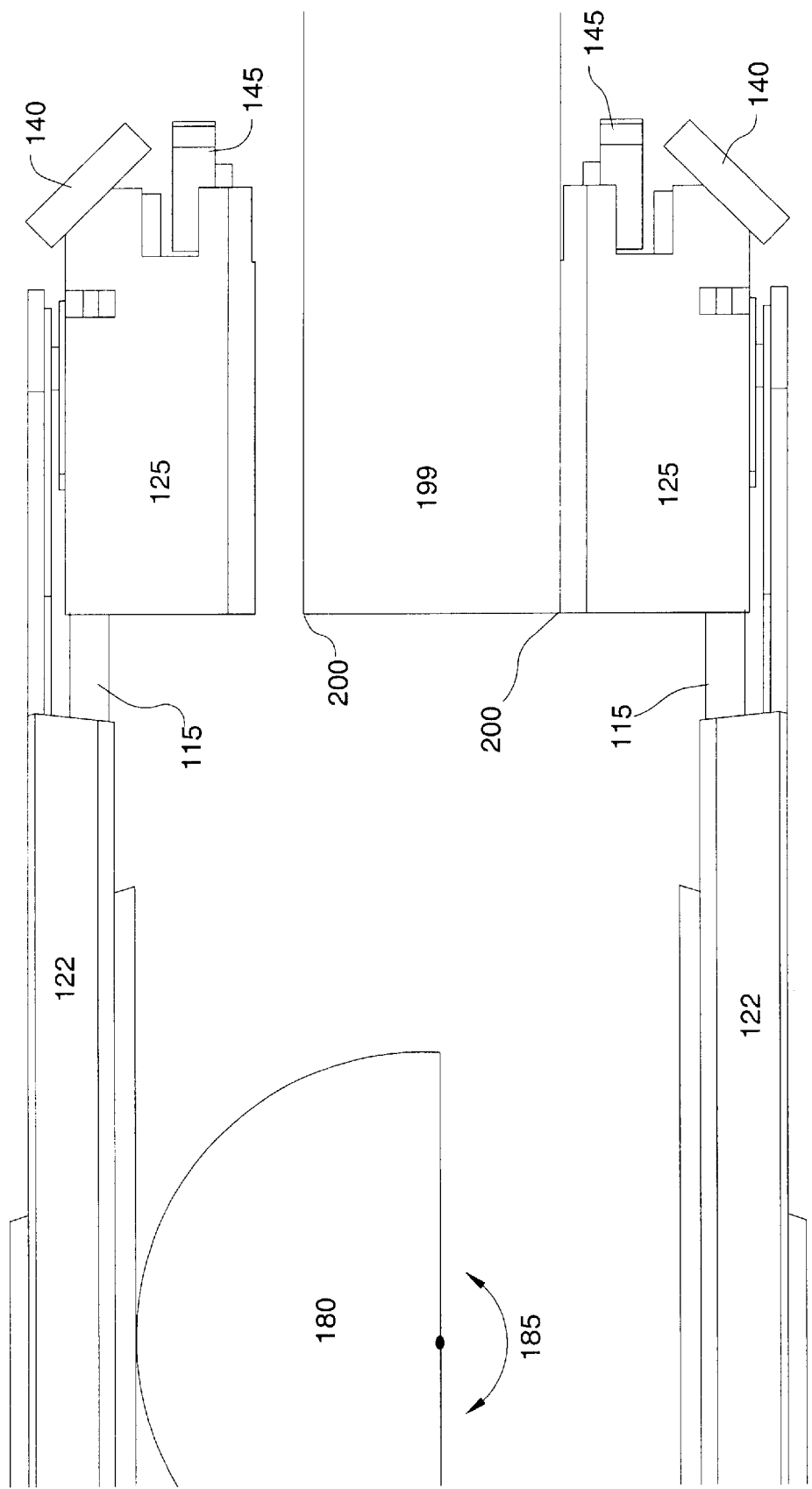
FIG. 8 is a view of an upper optical head (down facing) positioned in an unloaded position by a load cam and an opposing lower optical head (upper facing) resting on a lower side of an adapter plate.

Referring now to FIG. 8, there is seen an upper optical head 125 (down facing) positioned in an unloaded position by a load cam 180 and an opposing lower optical head 125 (upper facing) resting on a lower side 200 of the adapter plate 199. Alternatively, the load cam 180 may be rotated in a direction 185 by 180 degrees such that the upper head 125 is resting on an upper side 200 of the adapter plate 199 and the opposing lower optical head is positioned in an unloaded position. As is well known in the art, spring forces of the springs 122 associated with the respective unloaded optical heads 125 may be measured. Unlike the prior art, however, the present invention provides that the optical heads 125 resting against the lower surface 200, as well as fixed and dynamic optical components thereon, may be tested.

During testing of the optical heads 125 and fixed and dynamic optical components thereon, the light 160 from the optical switch 130 is directed down an optical fiber 115. The light exits the optical fiber 115 and is directed by the optics of the optical head 125 that is in contact with the adapter plate 199 onto the reflective layer 204. The reflected light 161 is reflected from the reflective surface 204 and returns through the optics and optical fiber 115. Preferably, when the optical head 125 is in contact with the adapter plate 199, the lens 145 will be a correct focal distance above at least a portion of the reflective layer 204 to reflect sufficient light back through the head 125. In the embodiment shown in FIG. 7a, the raised portion of the features 210 provides the sufficient light, while the lowered portion provides a physical discontinuity at a different focal length from the lens 145 of sufficient magnitude to cause a change in the reflected light 161 to be sensed. Preferably, the total outer dimensional thickness of the substrate 199 simulates the dimensional operating condition that would be encountered by the optical head 125 when used in the disk drive 100. Accordingly, a transparent protective coating 206 may be deposited over the adapter plate 199 to a thickness that simulates the flying height of the optical head 105 when used in the drive 100. It is understood that the adapter plate 199 of the present invention provides that that both upper and lower optical heads 125 may be tested with one test setup, as opposed to an embodiment that might rely on bulky detectors, the dimensions of which would require two setups, one for an upper optical head and second for a lower optical head.

One evaluation test that may be performed by the present invention includes functionality of the mirror 140, for example, the vector angle 141 of the moveable portion 146 of the mirror 140 as a function of applied voltage to the pads 143/144. In this test, as light 160 is vectored across the adapter plate 199 by the moveable portion 146, the pattern of features 210 will interrupt the reflected light 161. An optical measuring device that is sensitive to the changes in the reflected light 161 caused by the interruptions, for example, a photo-detector in the optical switch 130, may be positioned in the return path of the reflected light 161. An output from the optical detector may be used to provide a signal representative of these changes, such that, the vector angle 141 of the moveable portion 146 may be related to a count of how many times and at what rate the light 160 is reflected from the known number and dimensions of the features 210, verses an applied voltage to the electrodes 143, 144 of the mirror 140.

At the time that the vector angle 141 characterization is made, the mirror 140 may also be evaluated for frequency response. Several approaches may be taken to determine the mirror 140 frequency response, but the simplest is to output to the mirror 140 a series of voltage signals of varying voltage in a cyclic pattern. These signals may be applied in increasing frequencies up to the bandwidth of the mirror 140, and a corresponding number of pulses caused by the features 210 in the reflected light 161 may be observed. As the source frequency continues to increase, due to harmonic response limitations, the moveable portion 146 will not be able to reach its full deflection and fewer pulses per source cycle will be observed at some point. Eventually, the moveable portion 146 will not move at all for much higher frequencies. The mirror 140 and associated optics may then be evaluated based on the frequency response. For a quick go/no-go test, the number of pulses at a specified frequency may be counted.

Evaluation of the amplitude of the reflected light 161 may also provide an indication of the alignment between the optical components on the optical head 125, for example, between the optical fiber 115 and the mirror 140, the mirror and the lens 145, and the optical fiber 115 and the lens 145.

Also, the reflected light 161 may be detected to provide an indication of which optical fiber 115 at the optical switch end is attached to which optical head 125. This is beneficial in an embodiment in which the optical fibers 115 are bundled together at the optical switch end, wherein in such an embodiment it is difficult to distinguish and identify which optical fiber 115 is connected to which optical head 125

The adapter plate 199 is not limited to the embodiment described above. For example, in an alternative embodiment shown in FIG. 7c, the features 210 may be etched to include a depth equivalent to approximately the flying height of the optical head 125. In this first alternative embodiment, a protective coating 206 would not necessarily be required. In a second alternative embodiment shown in FIG. 7d the features 210 could be deposited on the substrate 201 rather than etched, other methods could include staining, burnishing, thin-film vapor deposition, and anodizing. It will be recognized that while the present invention has been described for use in conjunction with a gram-load fixture, with suitable modifications the invention's functionality can be provided as a stand alone device. It will also be identified that the present invention is not limited to testing of flying optical heads, but may be used to test magneto-optical heads, flying or otherwise. In a magneto-optical head embodiment, it is understood by those skilled in the art that a magnetic field generating element and/or other optical components may be required on the optical head. Furthermore, it is understood that the present invention is not limited to testing of dynamic components on optical heads but has utility in testing functionality of fixed optics.

Thus, while the present invention has been described herein with reference to particular embodiments thereof, a latitude of modification, various changes, and substitutions are intended with the present invention, and it will be appreciated that in some instances some features of the invention will be employed without a corresponding use of other features without departure from the scope of the invention.

What is claimed is:

1. An apparatus for testing a head stack assembly, comprising:
    a substrate, wherein said substrate receives a light from said head stack assembly and directs a reflection of said light back to said head stack assembly,
    wherein said head stack assembly comprises at least two optical heads,
    wherein said substrate comprises a surface, wherein said surface is disposed between said at least two optical heads,
    wherein said light from said head stack assembly is directed to said surface by a steerable mirror disposed on one of said at least two optical heads,
    wherein said steerable mirror acts to direct said light across a plurality of features, and
    wherein said one of said at least two optical heads is characterized based on a measurement of a voltage applied to said steerable mirror to deflect said steerable mirror.

2. The apparatus as recited in claim 1, wherein said substrate comprises a second surface disposed in generally parallel opposition to said first surface, wherein second surface comprises a plurality of features for disrupting said reflection of said light.

3. The apparatus of claim 1, further comprising an analyzer for analyzing said reflection of said light.

4. An apparatus for testing moveable optics, comprising:
    A substrate, wherein said substrate receives light from said moveable optics;
    reflection means for providing a reflection of said light; and
    analyzing means for characterizing said moveable optics based on said reflection of said light, wherein said reflection of light allows for a measurement of a voltage applied to said movable optics.

5. The apparatus as recited in claim 4, wherein said reflection means comprises disruption means for disrupting said light from said moveable optics.

6. The apparatus as recited in claim 5, wherein said moveable optics comprises a steerable mirror.

7. A method of testing a head stack assembly, comprising the steps of:
    directing a light towards a substrate utilizing optics of said head stacks assembly; receiving a reflection of said light from said substrate; and
    characterizing said head stack assembly based on said reflection of said light, wherein the characterizing is based at least partially on a measurement of a voltage determined from said reflection of said light.

8. The method as recited in claim 7, further comprising disruption of said light utilizing features comprised of said substrate.

9. The method as recited in claim 8, wherein said step of directing said light with said optics toward said substrate comprises utilizing dynamic optics to direct said light.

10. The method as recited in claim 9, wherein said optics comprises a steerable optics.

11. The method as recited in claim 10, wherein said characterization includes evaluating a functionality of said steerable optics.

12. The method as recited in claim 10, wherein said characterization includes evaluating a frequency response of said steerable optics.

13. The method as recited in claim 9, wherein said step of directing said light and receiving said reflection of said light comprises directing said light and receiving said reflection of said light with optics comprising an optical fiber.

14. The method as recited in claim 13, wherein said characterization includes detection of said reflected light from said optical fiber.

* * * * *